United States Patent Office 3,321,522
Patented May 23, 1967

3,321,522
2-AMINO-5-CHLORO-α-PHENYLBENZYL AMINE
Scott J. Childress and Stanley C. Bell, Philadelphia, and Theodore S. Sulkowski, Narberth, Pa., assignors to American Home Products Corporation, New York, N.Y., a corporation of Delaware
No Drawing. Filed Oct. 1, 1965, Ser. No. 492,310
1 Claim. (Cl. 260—570)

This application is a continuation-in-part of our application Ser. No. 362,919, filed Apr. 27, 1964 and now abandoned, which is a division of our application Ser. No. 233,467, filed Oct. 26, 1962.

This invention relates to composition of matter classified in the art of chemistry as substituted 2-amino-α-phenyl-benzyl amines.

The invention sought to be patented, in its composition aspect, is described as residing in the concept of the chemical compound having a molecular structure in which there is attached to the aliphatic carbon atom of a (2-amino-5-chlorophenyl)phenylmethane, the amino radical.

The tangible embodiment of the composition aspect of the invention possesses the inherent general physical properties of being substantially insoluble in water and soluble in inorganic acids. The tangible embodiment of the composition aspect forms a dihydrochloride which is a high melting white crystalline solid. The aforementioned characteristics taken together with the nature of the starting materials and the mode of synthesis, positively confirms the structure of the composition sought to be patented.

The tangible embodiment of the invention possesses the inherent applied use characteristic of exerting stimulant and anti-reserpine activity, as evidenced by pharmacological evaluation according to standard test procedures. This spectrum of activity is possessed by compounds sold commercially as anti-depressants, indicating the usefulness of the compound of this invention in the clinical treatment of depression. Moreover, the tangible embodiment of the invention possesses the use characteristic of being an intermediate for the preparation of 2H-1,4-benzodiazepin-2-ones which have significant anti-convulsant and muscle-relaxant effects as evidenced by pharmacological and clinical evaluation according to standard procedures.

The manner and process of making and using the invention will now be generally described so as to enable a person skilled in the art of chemistry to make and use the same as follows:

Chlorobenzophenone oxime employed as starting material in making the composition of the invention is generally known and is readily prepared by procedures known to those skilled in the art. To a solution of the oxime in a suitable solvent, such as, for example, ethanol or other solvent non-reactive under the hydrogenation conditions hereinafter set forth, is added 6 N hydrochloric acid in an amount in slight excess of 2 equivalents of the amount of oxime used and a catalytic amount of 10% palladium reported on charcoal. The mixture is hydrogenated until 2 equivalents of hydrogen have been consumed. The presence of the inorganic acid appears essential for the reaction to occur, as we found that in its absence hydrogenation did not take place.

The best mode contemplated by the inventors of carrying out their invention will now be set forth as follows:

Example

To a solution of 25 grams of 2-amino-5-chlorobenzophenone oxime in 500 ml. of ethanol and 40 ml. of 6 N hydrochloric acid add 5 grams of 10% palladium-charcoal. Hydrogenate at 56–60° until 2 mols of hydrogen have been consumed. Recrystallize from acetonitrile and isolate 2-amino-5-chloro-α-phenylbenzyl amine, as the dihydrochloride salt, melting point 221–223°.

*Analysis.*—Calcd. for $C_{13}H_{13}ClN \cdot 2HCl$: C, 51.10%; H, 4.95%; Cl, 34.81%; N, 9.07%. Found: C, 51.18%; H, 4.83%; Cl, 34.70%; N, 9.06%.

The following illustrates use of the invention as an intermediate:

Stir a mixture of 3 g. of 2-amino-5-chloro-α-phenylbenzylamine dihydrochloride, 1.5 g. ethyl chloroacetate, 1.5 g. magnesium oxide, and 75 ml. of 80% ethanol and reflux for 18 hours. Filter the mixture while hot and evaporate to dryness. Triturate the residue with ethyl acetate and filter. Stir the solid removed by filtration, in a suspension of 50 ml. of water and 50 ml. of ethyl acetate, and acidify with acetic acid. Separate the organic layer and remove the solvent, dissolve the residue in saturated sodium carbonate solution and filter. Acidify the filtrate with acetic acid to obtain N-(2-amino-5-chloro-α-phenylbenzyl)glycine, M.P. 190–192°.

Stir a mixture of 1 g. of N-(2-amino-5-chloro-α-phenylbenzyl)glycine in 25 ml. of ether and 1 g. of phosphorous pentachloride at 0° for 20 minutes, allow the temperature to rise to room temperature for one hour, and then heat under reflux for one-half hour. Add cautiously 50 ml. of water to the cool mixture, separate the aqueous layer, and make basic with sodium hydroxide solution. Collect and recrystallize from aqueous alcohol, 7-chloro-5-phenyl-1,3,4,5-tetrahydro-2H-1,4-benzodiazepin-2-one, M.P. 183–185°.

Dissolve 2.0 g. of 7-chloro-5-phenyl-1,2,3,4-tetrahydro-2H-1,4-benzodiazepin-2-one in dilute aqueous hydrochloric acid. Warm the solution and add dropwise a solution of potassium permanganate until the color is no longer dissipated. Filter the reaction mixture and neutralize the filtrate with sodium carbonate solution. Collect the resulting solid and recrystallize from alcohol to obtain 7-chloro-5-phenyl-1,3-dihydro-2H-1,4-benzodiazepin-2-one, M.P. 214–216°.

The subject matter which the applicants regard as their invention is particularly pointed out and distinctly claimed as follows:

2-amino-5-chloro-α-phenylbenzyl amine.

References Cited by the Examiner

UNITED STATES PATENTS

| | | |
|---|---|---|
| 1,921,424 | 8/1933 | Nabenhauer. |
| 2,505,645 | 4/1950 | McPhee. |
| 2,893,992 | 7/1959 | Sternbach _____ 260—570 X |

OTHER REFERENCES

Degering, "An Outline of Organic Nitrogen Compounds," pages 192–4 (1945).

Sidgwick, "The Organic Chemistry of Nitrogen," page 17 (1949).

Wagner et al., "Synthetic Organic Chemistry," page 658 (1953).

CHARLES B. PARKER, *Primary Examiner.*
ROBERT V. HINES, *Assistant Examiner.*